June 28, 1955  G. WEISHEIT  2,711,650
ELECTRONIC THERMOMETERS
Filed April 26, 1954
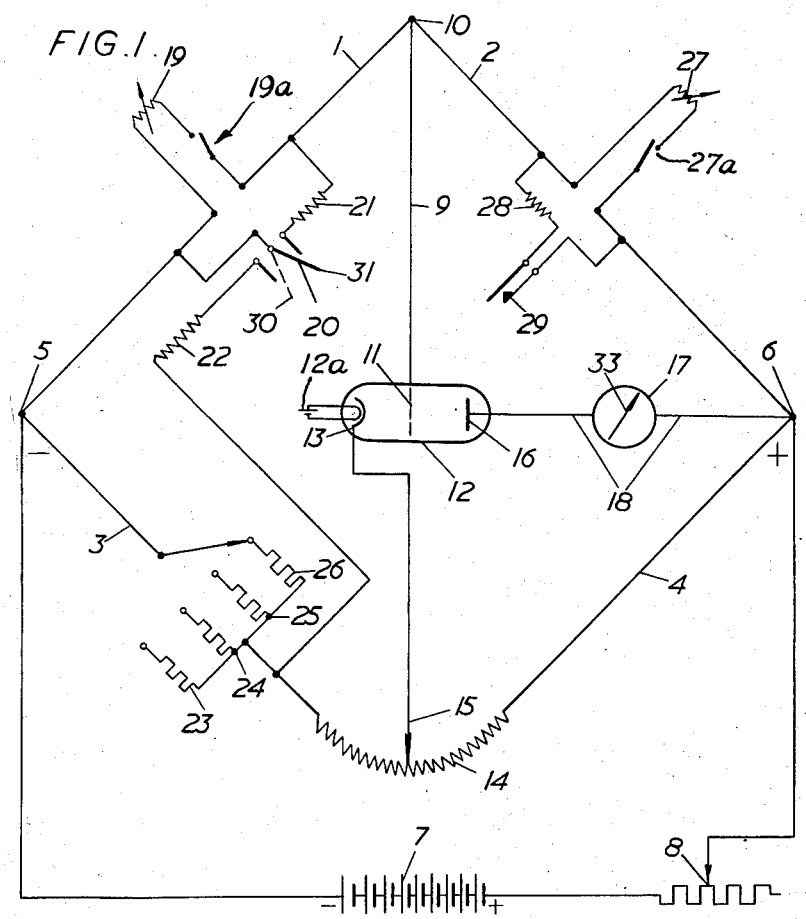
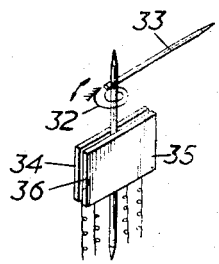
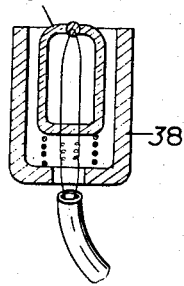
Inventor
GEORG WEISHEIT
By
Holcombe, Wetherill & Brisebois
Attorneys

United States Patent Office 2,711,650
Patented June 28, 1955

2,711,650

ELECTRONIC THERMOMETERS

Georg Weisheit, Essen-Stadtwald, Germany, assignor of one-half to Pollopas Patents Limited, London, England, a British company Application April 26, 1954, Serial No. 425,507

Claims priority, application Germany April 30, 1953

8 Claims. (Cl. 73—362)

This invention relates to an electronic temperature measuring device in which novel high ohmed semiconductor resistors are employed which have reproducible data such as characteristic lines, which may be chosen already during the manufacture. Such resistors are disclosed in my copending application Serial No. 425,178 filed April 23, 1954. According to the invention temperature feelers are arranged to control, through a quasi-electrostatic effect, amplifiers which in turn actuate a temperature-indicating device, for example an ammeter. For this purpose according to the invention, the temperature feelers are placed in circuit with other resistors to form a Wheatstone bridge, and the balancing branch of the Wheatstone bridge is connected to the grid and the cathode of an electronic valve. Included in the anode connection of the same valve is an ammeter which is graduated in temperature degrees, e. g. in degrees centigrade. According to a feature of the invention, the temperature feelers employed are so small that their heat inertia is lower by two orders of magnitude than that of hitherto known temperature feelers. Because of the high value of their ohmic resistance, the feelers operate according to the invention, with so small current that in the circuit according to the invention only a quasi-electrostatic effect of the feelers upon the grid of the electronic valve is produced, and the feelers are not subjected to any heating by flow of current. As a matter of fact the currents flowing in the temperature feelers are so small that normal measuring instruments will not indicate them.

The bridge, in which, according to the invention, the temperature feelers are arranged to control by their quasi-electrostatic effect the grid of an electronic valve acting as an amplifier, is, according to the invention, only provided with one single source of electric current which supplies the voltage both for the grid or measuring circuit and for the anode or indicating circuit of the electronic valve. Moreover the adjustment both of the grid bias voltage and of the anode voltage is, according to the invention, effected in one single bridge.

The advantages obtained by these features are considered to reside particularly in the fact that aging of the battery will affect the anode circuit and the grid circuit in the same manner and accordingly will not affect the result of the measurement. Thus the invention obtains automatic compensation of the voltage drop of the battery by providing a suitable voltage division between the anode and the grid according to the amplification factor of the valve. In principle various circuit arrangements are suitable for the execution of the idea of the invention.

Particularly advantageous is a Wheatstone bridge which has a measuring part and control part and to the branch points of which the voltage of a source of voltage is applied through an adjustable resistor serving as voltage controller. Two high-ohm temperature feelers producing a quasi-electrostatic effect and having a negative characteristic, and a resistor arrangement for use as graduating divider are preferably adapted to be selectively included in the measuring branch of the Wheatstone bridge. A further adjustable resistor is arranged in the controlling part of the bridge and serves, through an adjustable tapping, for the adjustment of the working point of the valve or the bridge. For this purpose the tapping is connected to the cathode of the electronic valve which through its grid is connected to a point of the measuring part of the bridge between the two temperature feelers and thus is included with its cathode and grid in the balancing line of the bridge. The anode is connected through an ammeter graduated in degrees of temperature, with that branch point of the bridge to which the positive pole of the source of voltage is applied. Advantageously resistors may be connected in parallel with the temperature feeler; these resistors may for example, after disconnection of the temperature feelers from the bridge, come into action and serve for graduation.

The thermometer according to the invention is suitable for absolute measurements and for difference measurements. When carrying out difference measurements, use is made of two temperature feelers in the measuring part of the bridge, each interposed between a branching point and the tapping point of the diagonal of the bridge. Advantageous is the provision of an additional grid resistor during the difference measurement, which bypasses the graduating divider resistors within the control part of the bridge and that branching point of the bridge which is connected with the negative pole of the battery.

When carrying out absolute measurements one of the temperature feelers is replaced by a resistor serving as reference resistor. This reference resistor corresponds in its magnitude to a mean resistance of the temperature feeler. This reference resistor should not alter its resistance value under the conditions of operation. On the other hand the resistance of the temperature feeler 19 arranged in the other branch of the bridge will, under the influence of the temperature, assume different values and thereby exert a quasi-electrostatic effect upon the grid voltage of the valve.

Hereinafter the invention will be further explained with reference to the accompanying schematic drawing of one embodiment, in which:

Fig. 1 is a circuit diagram

Fig. 2 is a diagrammatic perspective view of the movable part of the ammeter, and Fig. 3 shows the arrangement of a feeler in a glass envelope and the resilient mounting of the latter.

As illustrated in Fig. 1, the Wheatstone bridge comprises two measuring branches 1, 2, respectively connected to two control branches 3, 4 at branching points 5, 6 to which respectively the positive and negative poles of a source of voltage 7 are applied. In the line connecting the positive pole of the source of voltage to the branch point 6 there is included an adjustable voltage-control resistor 8. The balancing line 9 of the bridge leads from the junction point 10 of the branches 1 and 2 to the grid 11 of an electronic valve 12 the heater circuit of which is shown at 12a and from the cathode 13 of this electronic valve to an adjustable tapping 15 of a resistor 14 which is interposed between the branches 3 and 4 of the bridge so as to permit adjustment of the working point of the valve and thus of the bridge. By the provision of the resistor 14 in the adjusting range of the bridge such a voltage division is produced between the negative grid voltage and the anode voltage, that each alteration of the anode voltage is accompanied by an alteration of the grid voltage acting in the opposite sense, thereby automatically compensating any variations in the anode current that may occur and preventing the measurement from being affected by aging of the battery. The anode 16 of the electronic valve 12 is connected through the ammeter 17 and the conductor 18 with the positive branching point 6. Included in the measuring branch 1 of the bridge is on the one hand the temperature feeler 19 with a resistor 21 which can be connected in parallel to the feeler through a selectively operated change-over switch 20, while on the other hand there is connected to a contact of the change-over switch the resistor 22 which in its function is a grid resistor for the valve 12, so that the resistor 22 may be caused to bridge the branch point 5 and the graduating divider resistors 23, 24, 25, 26 arranged in the controlling branch 3 of the bridge. Included in the measuring branch 2 of the bridge is a second temperature feeler 27 provided with a graduating resistor 28 adapted to be connected in parallel, this being effected selectively by the switch 29.

When carrying out a temperature measurement, one or both of the temperature feelers 27 and 19 are included in the circuit by closing one or both of the switches 27a and 19a, while the graduating resistor 28 and the resistor 21 are out of circuit. When carrying out a temperature measurement as difference measurement, the switch 29 is in the position indicated at 30 so as to close the circuit in which the resistor 22 is included. On the other hand, when carrying out a temperature measurement as an absolute measurement, the temperature feeler 19 is removed or switched off, and the switch 20 is in position 31 so that the measuring branch 1 is closed through the resistor 21. The resistor 22 is out of circuit. The temperature feeler 27 performs its function, the graduating resistor 28 is switched off by means of the switch 29. When a temperature variation takes place the feeler 27 will influence by its quasi-electrostatic effect, the electronic conditions on grid 11 and thus the anode current of the valve, and the temperatures to which the feeler 27 is exposed, can be read direct in degrees of temperature on the ammeter 17. When carrying out graduation, both temperature feelers are switched off or removed. The switch 20 is in position 31, and the switch 29 is closed so that the bridge may be graduated by moving the tapping 15 of the resistor 14.

The individual resistors of the bridge are, according to the invention, made adjustable, e. g. as trimmer resistors. Thereby balancing of the bridge and adjustment of it to desired values becomes possible. Furthermore one may by such adjustment compensate minor differences in the individual feelers, e. g. as regards the gradient of the characteristic, whereby the provision of a standard scale independent of differences in the individual (but time-independent) values of the measuring feelers becomes possible. Thus the feelers in temperature measuring instruments according to the invention are interchangeable.

The invention further provides suppression of the zero point of the ammeter by the provision of an adjustable spring 32 (Fig. 2) so that movement of the pointer 33 will only commence when the control of the electronic valve has reached the linear part of its characteristic. According to an alternative arrangement according to the invention for solving the same problem, a second winding 34 is provided on the movable frame 35 of the measuring mechanism of the ammeter in addition to the normal winding 36 and a compensating current is arranged to flow through the second winding 36 which compensates the anode current to such an extent that the working range of the measuring instrument is shifted into the linear part of the characteristic of the electronic valve.

The feeler itself may, as shown in Fig. 3, be fused in a glass envelope 37 and the latter be mounted in such manner, e. g. by spring mountings 38, that when the feelers are applied to objects to be measured, the same application pressure will always prevail.

I claim:

1. An electronic thermometer, comprising a Wheatstone bridge having a measuring part, constituted by two branches of the bridge circuit and a control part constituted by the other two branches of the bridge circuit, two temperature feelers arranged in said measuring part, said control part being constituted by a resistor arrangement formed as a graduating divider and by a resistor having an adjustable tapping, and an electronic valve having a grid which is connected to a point on the measuring part between said temperature feelers, a cathode connected to said tapping, and an anode, an ammeter graduated in temperature degrees, a source of direct-current voltage having a negative and a positive pole, said poles being respectively connected to the two junction points between said measuring and control parts, an adjustable resistor in the connection between said source and one of said junctions, said anode being connected through said ammeter to that one of said junctions to which the positive pole of said source is connected.

2. Electronic thermometer as claimed in claim 1, wherein each said temperature feeler is a high-ohmed resistor having a negative temperature coefficient and producing a quasi-electrostatic effect.

3. Eletronic thermometer as claimed in claim 1, including two auxiliary resistors respectively associated with the two temperature feelers, and means for excluding said temperature feelers from the bridge and substituting therefor said auxiliary resistors to permit calibration of the ammeter scale.

4. Electronic thermometer as claimed in claim 1, including an additional grid resistor and means for including said grid resistor in the circuit for carrying out difference measurements.

5. Electronic thermometer as claimed in claim 4, wherein said grid resistor is so arranged as to by-pass, when included in the circuit, said graduating divider arrangement and said junction connected to the negative pole of the source of voltage.

6. Electronic thermometer as claimed in claim 1, including means for shifting the voltage range of the measuring instrument into the linear part of the characteristic of the electronic valve.

7. Electronic thermometer as claimed in claim 6, wherein said shifting means comprises mechanical zero-point suppression means.

8. Electronic thermometer as claimed in claim 6, wherein said shifting means comprises a second winding on the frame of the ammeter coil, and means for passing through said second winding a compensating current rendering the anode starting current of the valve ineffective.

References Cited in the file of this patent

UNITED STATES PATENTS

| | | |
|---|---|---|
| 1,840,635 | Parker | Jan. 12, 1932 |
| 1,951,276 | Edwards et al. | Mar. 13, 1934 |
| 2,017,011 | Meyer | Oct. 8, 1935 |
| 2,135,513 | Holven | Nov. 8, 1938 |
| 2,444,410 | Keinath | June 29, 1948 |

FOREIGN PATENTS

| | | |
|---|---|---|
| 597,420 | Great Britain | Jan. 26, 1948 |